Feb. 16, 1960  S. ZISLER  2,925,596
CIRCULARLY POLARIZED AIRCRAFT GUIDING SYSTEMS
Filed Nov. 9, 1953

United States Patent Office 2,925,596
Patented Feb. 16, 1960

2,925,596

CIRCULARLY POLARIZED AIRCRAFT GUIDING SYSTEMS

Siegfried Zisler, Marcoussis, France, assignor to Societe Francaise Sadir-Carpentier, Paris, France, a corporation of France Application November 9, 1953, Serial No. 391,038

Claims priority, application France December 17, 1952

2 Claims. (Cl. 343—100)

It is a well-known fact that the so-called homing method for guiding aircraft consists in guiding an aircraft towards a transmitting station radiating within at least a portion of space an electromagnetic field, the guidance being achieved by providing on board the aircraft a system of aerials or of combinations of aerials adapted to be interconnected in two different ways so as to produce two different receiving diagrams, the two diagrams obtained being symmetrical with reference to each other on each side of the longitudinal plane of symmetry of the aircraft. The shifting from one diagram to the other is performed by a switching operation.

The aircraft is accurately guided, that is, its plane of symmetry passes through the transmitting station, when the voltages received through the aerials are equal in both connections of the aerials and consequently whichever diagram is considered.

The aerials employed may include two dipoles arranged symmetrically with reference to the longitudinal vertical plane of symmetry of the aircraft.

In the existing method, the waves of the electromagnetic field radiated from the fixed transmitting station are rectilinearly polarized and, as will hereinafter be shown, with such rectilinearly polarized waves, the indication of the direction of travel of the aircraft with respect to the direction from the aircraft to the transmitting station is affected by rolling of the aircraft about its longitudinal axis so that such rolling movement of the aircraft will give a false indication of the direction of travel of the aircraft.

Accordingly, it is an object of the present invention to avoid the above disadvantage of the existing homing method, that is, to provide a homing method and system wherein the accuracy of homing is unaffected by rolling of the guided aircraft about its longitudinal axis.

In accordance with an aspect of the present invention, the above object is achieved by circularly polarizing the waves radiated from the fixed transmitting station.

In the accompanying drawings, illustrating my invention:

Figure 1:
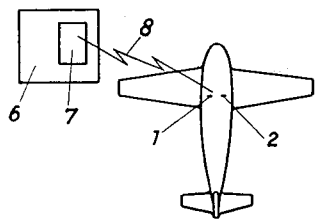
Fig. 1 shows in a highly diagrammatic manner, an aircraft in plan view with its two aerials 1 and 2, used for homing purposes.

In Fig. 1, two aerials 1 and 2 are located side by side on the aircraft, and are constituted by mere dipoles extending vertically when the aircraft flies horizontally along a rectilinear path, the plane of symmetry being vertical. These aerials are adapted to be connected with the receiver in two different ways, as mentioned hereinabove, so as to alternately produce two different receiving diagrams. A ground station 6 radiates circularly polarized waves 8 by means of a transmitter 7 which are received by the aerials of the aircraft.

Figure 2:
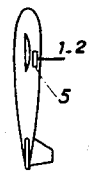
Fig. 2 is a cross-section of said aircraft in the longitudinal plane of symmetry.

Fig. 2 shows the aircraft containing a receiver 5 connected to the antennas 1—2 for indicating the difference of the amplitudes of the separately received waves.

Figure 3:
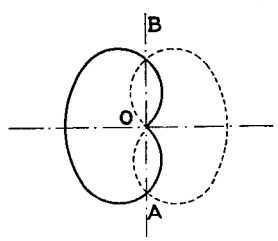
Fig. 3 shows a homing diagram.

Fig. 3 shows, in solid lines, the diagram of such a system for a first position given to the switching means. The curve shown in dotted lines illustrates the same diagram as transformed when received with the switching means in the other position. These two curves intersect each other in the usual manner at points located on the straight line AB corresponding to the longitudinal axis of the aircraft.

Figure 4:
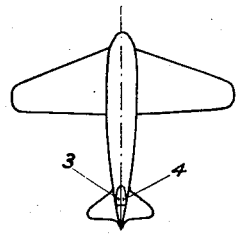
Fig. 4 illustrates a further arrangement of the aerials on an aircraft.

Fig. 4 shows another arrangement of aerials 3 and 4 fitted inside the vertical fin of the aircraft and located so that the radiation diagrams are substantially identical with those illustrated in Fig. 3. These aerials, as shown in Fig. 4, have been described in the French Patent No. 1,055,365, filed on May 2, 1952, by applicant's assignee, the Sadir-Carpentier Company, under the title "Radio-electric aerials."

In all cases, the aerials located at any point on the aircraft form with the metal parts of the aircraft or counterpoise an aerial, i.e. a wave-collecting system the conductive sections of which extend in different directions in space. It is a well-known fact that all the metal parts of the aircraft which serve as a counterpoise should be considered as forming part of the valve-collecting means in the same manner as the actual aerial 1 or 2. Consequently, the polarization of the aerial is not defined solely by the angular setting of the aerial 1 or 2, but also by the structure of the whole system and this polarization generally changes with the position of the aircraft in space with reference to the transmitting station.

In other words, if the aerials serve as transmitting aerials, the radiated field is polarized in a well-defined manner. For each direction of radiation, this polarization is generally of the elliptic type, the magnitude and the eccentricity of the ellipse and also the angular setting of its axes varying with the direction of propagation considered.

By reason of the principle of reciprocity, said ellipses also define, as is well known, the voltages induced in the aerials, by a given field, when acting as receivers. It is therefore possible to consider such polarization ellipses as actually associated with a receiving aerial.

The transmitting station located at ground level for the guiding of aircraft operate normally with an aerial the polarization of which is rectilinear in a vertical or in a horizontal plane. For reasons relating to the transmission of energy, the polarization on board the aircraft should be the same as that of the ground station. I therefore provide on board the aircraft aerials which are polarized vertically, i.e. in a plane perpendicular to the plane of the wings of the aircraft, in the case of a vertical aerial being used at ground level, while the aerials on board the aircraft should be polarized horizontally, i.e. in the plane of the wings of the aircraft, in the case of a horizontal aerial at ground level. Considering now two aerials symmetrically carried by an aircraft with reference to the axis of the aircraft as in the case of Figs. 1 and 2 or of Fig. 4, the symmetry in the mounting of the aerial is resorted to with a view to furthering the production of two diagrams, as shown in Fig. 3. As is well-known in the art, such diagrams may be obtained through reflective action or through phase-shifted connections between the two aerials.

Figure 5:
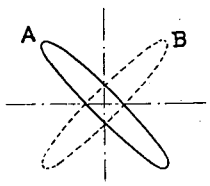
Figs. 5 to 10 are further explanatory figures and diagrams.

For one of the possible connections between the aerials, the polarization ellipse assumes e.g. the shape appearing in solid lines at A in Fig. 5 when the aircraft shown in Fig. 1 lies normally in the direction leading to the transmitting station; i.e. with its wings lying in a horizontal plane. By reason of symmetry, the ellipse for the second combination of aerials is arranged symmetrically with reference to the first ellipse, as shown in dotted lines at B. As is clearly apparent from inspection of Fig. 5, the major axes of the ellipses are at an angle with the vertical.

Experiments made by myself have shown that in the case where the aircraft retains its plane of symmetry directed towards the transmitting station but assumes a varying position with reference to a horizontal plane by rocking round its longitudinal axis, it may be estimated as a first approximation that the polarization ellipses are rigid with the aircraft and move in unison therewith, without any substantial change in their shape or size. In other words, when the aircraft in Fig. 1 remains directed towards the transmitting station and assumes the position shown in Fig. 6, with the plane of its wings forming an angle α with the horizontal plane, the polarization ellipses shown in Fig. 5 also rock by an angle α and assume the angularly shifted positions illustrated in Fig. 7.

It is apparent that this bodily shifting of the polarization ellipses is accurately performed, as will be readily ascertained, in the direction of the longitudinal axis of the aircraft and the experiments made by myself have shown that this shifting is still substantially observed in directions that remain very near the direction of said axis in a vertical plane, and which are those generally used for homing purposes.

When receiving waves that are polarized along a vertical line, as when using a vertical aerial at ground level, the received voltages connected across the terminals of the aircraft aerials, are determined by the projection on a vertical line of the vector describing the ellipse.

Figure 6:
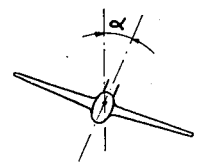
Figure 7:
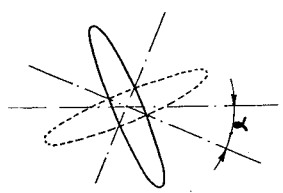

Consequently, if the wings are horizontal as in the case of Fig. 5, the two voltages collected are equal while, if the aircraft rolls about its longitudinal axis so that the wings are sloping, as shown in Fig. 7, the two voltages are different. Experience confirms this theory and shows that the voltages received in the direction of the axis when the aircraft is in the position illustrated in Fig. 6, are actually different and the diagrams shown in Fig. 3 are deformed and assume the shape and size appearing in Fig. 8.

Figure 8:
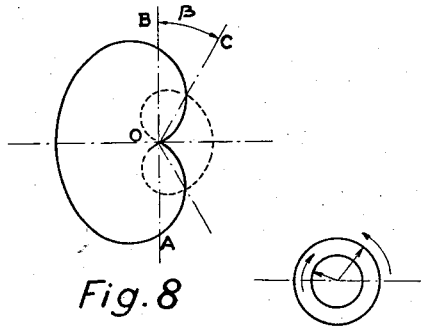

Consequently, when the aircraft assumes a position such as that shown in Fig. 6, the indicating means carried on board the aircraft give out an indication which is different from zero since the direction OC (Fig. 8) passing through the point of intersection of the diagram and for which the indicating means give out the direction of the transmitting station, forms an angle β with the direction OB of the longitudinal axis of the aircraft. In other words, the indicating means provide an erroneous indication, since the aircraft actually heads towards the transmitting station, as desired. Of course, if the aircraft assumes a position wherein the wings slope in the direction opposite to that shown in Fig. 6, the two diagrams of Fig. 8 are reversed with reference to AB so that the indicating means again produce an error of the same magnitude and in the opposite direction.

The same arguments hold true, as is immediately apparent, in the case where the transmitting station produces waves that are polarized rectilinearly in a horizontal plane.

In brief, the action of the metal surfaces of the aircraft, in the case of a transmission for guiding aircraft in accordance with the homing method and employing rectilinearly polarized waves, whether in a horizontal or in a vertical plane, leads to erroneous results when the aircraft rocks about its longitudinal axis.

The present invention avoids this disadvantage inherent in systems employing radiated waves assuming a rectilinear, vertical or horizontal polarization, by substituting therefor waves assuming a circular polarization.

Further experiments made by myself have shown that it is possible, with a field radiating circularly polarized waves, to eliminate the possibility of such erroneous results as referred to hereinabove. This may be explained in the following manner: as is well known, the vector defining an elliptic field of polarization, which is the general case, may be broken down into two vectors of constant amplitude and revolving at a uniform speed in opposite directions. The direction of rotation of the resultant vector is the same as that of the larger of the two vectors.

Figure 9:
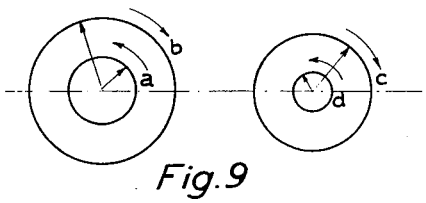

In the case of a linear polarization, the lengths of two vectors are equal and in the case of a circular polarization, one of the two vectors is always equal to zero. It is also a well-known fact that the voltage collected across the terminals of a complex receiving aerial of the type described hereinabove, may be calculated in the manner disclosed hereinafter with reference to Fig. 9.

For the direction of propagation to be considered, the elliptic polarization associated with the receiving aerials may be broken down, as mentioned, into two vectors of constant length describing the circles a and b in the direction shown by the arrows.

The field produced by the transmitting station at ground level which is also a field of elliptically polarized waves, is similarly defined by two vectors describing, at a uniform speed, the circles c and d, the vector describing the circle c revolving in the same direction as the vector describing the circle b, while d turns in the same direction as a.

Under such conditions, the voltage induced in the receiving aerials may be considered as the vectorial sum of:

(1) The voltage induced by the field, defined by the revolving vector describing the circle c on an imaginary circularly polarized aerial, as illustrated by the circle b;

(2) The voltage induced by a field illustrated by a vector describing the circle d on an imaginary aerial polarized circularly, as illustrated by the circle a.

In other words, each of the component vectors forming the transmitted field, acts solely on the component rotary vector corresponding thereto and revolving in the same direction in the polarization diagram associated with the receiving aerial.

This shows that, in the case where the transmitted field is circularly polarized, one of the two circles, say the circle d disappears and, consequently, there only remains the action of the field illustrated by the vector describing the circle c on the imaginary circularly polarized aerial corresponding to the circle b.

Figure 10:
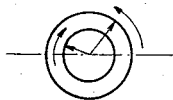

Now, if we consider a circularly polarized field acting on the aerials having polarization ellipses as illustrated in Fig. 5, the vectors describing the two ellipses illustrated revolve by reason of symmetry in opposite directions and therefore if, as disclosed hereinabove, the vector describing the ellipse shown in solid lines is broken down into two circle-describing vectors, I obtain two circles as illustrated in Fig. 10, the larger of which is described, e.g. in the direction shown by the exterior arrow. As to the vector describing the ellipse shown in dotted lines, the same break down is possible but the directions of rotation are reversed. Thus a field of circularly polarized waves, the vector of which revolves in the same direction as the larger component vector, will produce at the receiver end a voltage which is proportional to the radius of the larger circle for the ellipse A and a received voltage proportional to the radius of the smaller circle for the ellipse B. The essential point to be noted is that these voltages are independent of the position of the plane of the wings with reference to the horizontal. This is due to the fact that the polarization ellipses move bodily with the aircraft. Consequently, only the phase of the high frequency voltages collected is modified by the modifications in the angular setting of the aircraft with reference to its longitudinal axis and this modification is irrelevant as concerns the homing procedure.

The fact that the voltages collected may be different when the aircraft is accurately headed, may be easily corrected by a permanent initial adjustment of the receiving system so that the indications given may be accurate when the aircraft is correctly headed.

It is presently known how to produce transmitting stations having aerials which provide, throughout the areas in space in which an aircraft is to be guided through the homing method, circularly polarized waves. It is therefore, unnecessary to describe such transmitting stations in detail but it is generally to be noted that helically shaped aerials or combinations of suitably fed dipoles assuming various directions in space may be used for this purpose.

What I claim is:

1. In a homing system for aircraft including a pair of antennas on the aircraft having different directional responses for separately receiving circularly polarized waves radiated from a fixed station and means connected to the antennas for indicating the difference of the amplitudes of the separately received waves as a function of the actual direction of travel of the aircraft with respect to the direction from the aircraft to said fixed station; means at said fixed station radiating circularly polarized waves so that the indication of the difference of the amplitudes of the separately received waves will be unaffected by rolling of the aircraft.

2. A homing system for aircraft comprising means at a ground station for radiating circularly polarized waves, a pair of antennas on the aircraft having different directional responses for separately receiving said waves, and means connected to said antennas and operative to indicate the difference between the amplitudes of the separately received waves as a function of the actual direction of travel of the aircraft relative to the direction from the aircraft to said ground station.

References Cited in the file of this patent

UNITED STATES PATENTS

| | | |
|---|---|---|
| 1,805,591 | Ohl | May 19, 1931 |
| 1,892,221 | Runge | Dec. 27, 1932 |
| 2,174,353 | Roberts | Sept. 26, 1939 |
| 2,216,708 | Kolster | Oct. 1, 1940 |
| 2,403,500 | Carlson | July 9, 1946 |
| 2,502,394 | Smith | Mar. 28, 1950 |

FOREIGN PATENTS

| | | |
|---|---|---|
| 465,502 | Germany | Sept. 20, 1928 |
| 2,489,615 | Great Britain | Nov. 29, 1949 |